United States Patent [19]
Dundy

[11] 3,789,075
[45] Jan. 29, 1974

[54] PREPARATION OF HYDROCARBYLAMINE SALT OF THIOCYANIC
[75] Inventor: Morris Dundy, Beacon, N.Y.
[73] Assignee: Texaco Inc., New York, N.Y.
[22] Filed: Sept. 17, 1971
[21] Appl. No.: 181,608

[52] U.S. Cl. ............................. 260/583 R, 252/47.5
[51] Int. Cl. .............................................. C07c 87/04
[58] Field of Search .................................. 260/583 R

[56] References Cited
UNITED STATES PATENTS
2,362,890  11/1944  Dietrich ............................... 252/47
2,376,796  5/1945  Mathes ............................ 260/253 R Primary Examiner—Elbert L. Roberts
Assistant Examiner—D. R. Phillips
Attorney, Agent, or Firm—Thomas H. Whaley et al.

[57] ABSTRACT

Method for preparing a hydrocarbylamine salt of thiocyanic acid by reacting equimolar amounts of ammonium thiocyanate and a hydrocarbylamine in the presence of a low molecular weight aliphatic alcohol.

7 Claims, No Drawings

PREPARATION OF HYDROCARBYLAMINE SALT OF THIOCYANIC

BACKGROUND OF THE INVENTION

1. Field of the Invention

This invention is concerned with an improved method for preparing hydrocarbylamine salts of thiocyanic acid. Heretofore, hydrocarbylamine salts of thiocyanic acid have been prepared by reacting a hydrocarbylamine with ammonium thiocyanate over an extended period of time and in the absence of any solvent during the initial reaction step. Thereafter, the reaction product mixture is dissolved in a hydrocarbon solvent, such as benzene which dissolves the hydrocarbylamine salt of thiocyanic acid and permits the filtering off of the unreacted materials. This benzene solution is then subjected to distillation in order to effect recovery of the hydrocarbylamine salts of thiocyanic acid. This method of reaction requires an extended reaction period of many hours for completion.

2. Description of the Prior Art

U.S. Pat. No. 2,362,890 discloses a method for preparing hydrocarbylamine salts of thiocyanic acid according to the above-described method wherein reaction periods in excess of 15 hours are disclosed and the use of a hydrocarbon solvent, such as benzene, is also disclosed.

U.S. Pat. No. 3,330,763 discloses the use of hydrocarbylamine salts of thiocyanic acid as load-carrying additives in lubricating oils.

SUMMARY OF THE INVENTION

The method of the invention comprises reacting a hydrocarbylamine with ammonium thiocyanate in the presence of a low molecular weight aliphatic alcohol to produce the hydrocarbylamine salt of thiocyanic acid.

More specifically, a hydrocarbylamine salt of thiocyanic acid, having the formula:

$$RR'NH_2SCN$$

in which R represents a hydrocarbyl radical having from 1 to 22 carbon atoms, and R' represents hydrogen or an aliphatic hydrocarbon radical having from 1 through 20 carbon atoms, is prepared by reacting equimolar amounts of ammonium thiocyanate and a hydrocarbylamine having the formula:

$$RR'NH$$

in which R and R' have the values noted above, in the presence of a low molecular weight aliphatic alcohol and thereafter stripping of said alcohol at reflux temperature to recover said salt.

The hydrocarbylamine reactant employed in this process corresponds to the formula:

$$RR'NH$$

in which R represents a hydrocarbyl radical having from 1 to 22 carbon atoms and R' represents hydrogen or an aliphatic hydrocarbyl radical having from 1 to 20 carbon atoms. The preferred hydrocarbylamine compounds are those in which R represents an aliphatic hydrocarbon radical having from 8 through 20 carbon atoms and R' represents hydrogen. Specific hydrocarbylamine reactants include $C_{18}$ to $C_{22}$ tertiary alkyl primary amine, $C_{11}$ to $C_{14}$ tertiary alkyl primary amine stearylamine, dodecylamine and 2-ethylhexylamine.

The hydrocarbylamine and ammonium thiocyanate are reacted in solution in a low molecular weight aliphatic alcohol corresponding to the formula:

$$ROH$$

in which R represents an aliphatic hydrocarbon radical having from 1 to 4 carbon atoms. The preferred alcohol for this reaction is methanol. Other suitable alcohols are ethanol, isopropanol and butyl alcohols. The higher alcohols require a larger amount to dissolve the reactants.

Essentially equimolar amounts of the hydrocarbylamine and the ammonium thiocyanate are reacted together although a greater or lesser amount of either of the components can be employed with some loss in efficiency. The reaction is generally conducted at a temperature ranging from about 20° to 90°C with the preferred reaction temperature being about 70°C. Under these conditions, the reaction proceeds very quickly accompanied by the evolution of ammonia from the reaction mixture. The formation of the hydrocarbylamine salt of thiocyanic acid will generally be completed in a matter of a few minutes according to this method.

The hydrocarbylamine thiocyanate is recovered from the reaction mixture by distilling off the aliphatic alcohol solvent. This is readily accomplished by subjecting the reaction mixture to a vacuum under which the alcohol distills off. This step is expedited by passing an inert gas through the reaction mixture. Nitrogen is the preferred inert gas although other gases, such as carbon dioxide can also be employed.

Examples of hydrocarbylamine thiocyanates which can be prepared according to the present process include laurylamine thiocyanate, stearylamine thiocyanate, decylamine thiocyanate and 2-ethylhexylamine thiocyanate.

The following examples illustrate the preparation of a hydrocarbylamine thiocyanate according to the present process.

EXAMPLE 22.8 grams (0.31 mole) ammonium thiocyanate was dissolved in 70 milliliters of methanol. 97.7 grams (0.31 mole) $C_{18}$ to $C_{22}$ tertiary alkyl primary amine was dissolved in 100 milliliters of methanol. The two solutions were admixed and heated at reflux temperature (68°C) for 15 minutes while under agitation. The methanol was then stripped from the reaction mixture under vacuum. 115 grams of $C_{18}$ to $C_{22}$ tertiary alkylamine salt of thiocyanic acid was recovered. Analysis of the product gave the following results:

|  | Observed | Theory |
|---|---|---|
| Nitrogen % | 7.8 | 7.5 |
| Sulfur % | 8.3 | 8.6 |
| Neutralization No. | 149 | 150 |

This product was an effective load-carrying additive in a synthetic ester base lubricating oil composition.

I claim:

1. A method for preparing a hydrocarbylamine salt of thiocyanic acid having the formula:

$$RR'NH_2SCN$$

in which R represents an aliphatic hydrocarbon radical having from 1 to 22 carbon atoms, and R' represents hydrogen or an aliphatic hydrocarbon radical having from 1 to 20 carbon atom which comprises reacting equimolar amounts of ammonium thiocyanate and a hydrocarbylamine having the formula:

RR'NH in which R and R' have the values noted above, in the presence of a low molecular weight aliphatic alcohol and thereafter stripping off said aliphatic alcohol at reflux temperature to recover said salt.

2. A method according to claim 1 in which R represents an aliphatic hydrocarbon radical having from 8 to 20 carbon atoms and R' is hydrogen.

3. A method according to claim 1 in which said reaction is conducted at a temperature from about 15° to 30°C.

4. A method according to claim 1 in which said low molecular weight aliphatic alcohol has the formula ROH in which R represents an alkyl radical having from 1 to 4 carbon atoms.

5. A method according to claim 1 in which said aliphatic alcohol is methanol.

6. A method according to claim 1 in which said stripping is conducted with the aid of an inert gas.

7. A method according to claim 6 in which said inert gas is nitrogen.

* * * * *